(12) United States Patent
Yu (10) Patent No.: US 7,660,345 B2
(45) Date of Patent: Feb. 9, 2010

(54) TRANSCEIVER APPARATUS AND METHOD HAVING ETHERNET-OVER-POWER AND POWER-OVER-ETHERNET CAPABILITY

(75) Inventor: Hong Yu, Hollis, NH (US)

(73) Assignee: Aboundi, Inc., Nashua, NH (US)

( * ) Notice: Subject to any disclaimer, the term of this patent is extended or adjusted under 35 U.S.C. 154(b) by 765 days.

(21) Appl. No.: 10/871,361

(22) Filed: Jun. 18, 2004

(65) Prior Publication Data
US 2005/0281326 A1 Dec. 22, 2005

(51) Int. Cl.
*H04B 1/38* (2006.01)
(52) U.S. Cl. ............... 375/222; 375/219; 375/220; 375/257
(58) Field of Classification Search ........ 375/219, 375/220, 222, 257, 22, 357; 713/300
See application file for complete search history.

(56) References Cited

U.S. PATENT DOCUMENTS

| | | | |
|---|---|---|---|
| 4,890,102 A | 12/1989 | Oliver | |
| 5,268,666 A * | 12/1993 | Michel et al. | 340/310.16 |
| 5,406,260 A | 4/1995 | Cummings et al. | |
| 5,977,913 A * | 11/1999 | Christ | 342/465 |
| 6,151,480 A * | 11/2000 | Fischer et al. | 340/310.12 |
| 6,154,774 A | 11/2000 | Furlong et al. | |
| 6,218,930 B1 | 4/2001 | Katzenberg et al. | |
| 6,383,076 B1 * | 5/2002 | Tiedeken | 463/40 |
| 6,522,873 B1 * | 2/2003 | Moles et al. | 455/343.1 |
| 6,643,566 B1 | 11/2003 | Lehr et al. | |
| 6,647,117 B1 * | 11/2003 | Wallace et al. | 379/413 |
| 6,934,862 B2 * | 8/2005 | Sharood et al. | 713/300 |
| 7,058,524 B2 * | 6/2006 | Hayes et al. | 702/62 |
| 2002/0022991 A1 * | 2/2002 | Sharood et al. | 705/14 |
| 2002/0041228 A1 * | 4/2002 | Zhang | 340/310.01 |
| 2002/0060617 A1 | 5/2002 | Walbeck et al. | |
| 2002/0060624 A1 * | 5/2002 | Zhang | 340/310.01 |
| 2002/0080010 A1 * | 6/2002 | Zhang | 340/310.06 |
| 2002/0095662 A1 | 7/2002 | Ashlock et al. | |

(Continued)

FOREIGN PATENT DOCUMENTS

| | | |
|---|---|---|
| CN | 1364013 | 8/2002 |
| CN | 1479442 | 3/2004 |
| EP | 1 343 253 A | 9/2003 |

OTHER PUBLICATIONS

Pacchiano, R., "Power Over Ethernet vs. Powerline Technology," www.smallbusinesscomputing.com, *Internet Planet, Conference & Expo*, Jun. 15-16, 2004, New York, NY.

(Continued)

*Primary Examiner*—Emmanuel Bayard
(74) *Attorney, Agent, or Firm*—Hamilton, Brook, Smith & Reynolds, P.C.

(57) ABSTRACT

A transceiver device for coupling between a power line and a network interface unit includes a power line modem for transmitting and receiving data between the power line and the network interface unit and a power circuit coupled to the power line modem that is adapted to deliver a DC power signal to the network interface unit. The power circuit includes a discovery circuit adapted to determine the type of network interface unit that is attached. A load path control circuit switches the DC power signal between a PHY interface and a connector interface of the power line modem based on the determined type.

24 Claims, 5 Drawing Sheets

U.S. PATENT DOCUMENTS

| 2002/0196843 | A1* | 12/2002 | Ben-Bassat et al. ......... 375/219 |
| 2003/0072438 | A1 | 4/2003 | Le Creff et al. |
| 2003/0088706 | A1 | 5/2003 | Chan et al. |
| 2003/0099076 | A1 | 5/2003 | Elkayam et al. |
| 2003/0112965 | A1 | 6/2003 | McNamara et al. |
| 2003/0146765 | A1 | 8/2003 | Darshan et al. |
| 2003/0194912 | A1 | 10/2003 | Ferentz |
| 2004/0001440 | A1 | 1/2004 | Kostoff, II et al. |
| 2004/0083066 | A1 | 4/2004 | Hayes et al. |
| 2004/0116163 | A1* | 6/2004 | Kim et al. ................ 455/575.1 |
| 2004/0162117 | A1* | 8/2004 | Liebenow ................... 455/572 |
| 2004/0258141 | A1* | 12/2004 | Tustison et al. ............. 375/219 |

OTHER PUBLICATIONS

Morrison, David G., Staff, The Authority on Emerging Technologies for Design Solutions, Electronic Design Update: Feb. 12, 2003, *electronic design*, www.elecdesign.com, Update: Feb. 12, 2003.

IEEE Std 802.3af™-2003, (Amendment to IEEE Std 802.3™-2002, including IEEE Std 802.3ae™-2002), Part 3: Carrier Sense Multiple Access with Collision Detection (CSMA/CD) Access Method and Physical Layer Specifications; Amendment: Data Terminal Equipment (DTE) Power via Media Dependent Interface (MDI), IEEE Computer Society, Sponsored by the LAN/MAN Standards Committee, Published by The Institute of Electrical and Electronics Engineers, Inc., Jun. 18, 2003.

Lawson, Stephen, "Cisco Powers Up Ethernet Ports With Global Standard," IDG News Service, InfoWorld, Feb. 18, 2004.

Sikora, A., "Erweiterungen Fuer Das Ethernet Rapid Spanning Tree, Power Over Ethernet Und Ethernet In The First Mile, 2. Teil," *Elektronik, Weka Fachzeitscr.* 52(19):44-48 (2003).

English Translation of Office Action issued in Chinese Application No. 200580020185.1, dated Aug. 14, 2009, 9 pages.

* cited by examiner

TRANSCEIVER APPARATUS AND METHOD HAVING ETHERNET-OVER-POWER AND POWER-OVER-ETHERNET CAPABILITY

BACKGROUND OF THE INVENTION

As usage of the Internet expands, more and more people are purchasing multiple Personal Computers (PCs) for use by family members in the home. These multiple PCs can be "networked" together in the home to share and access common resources such as printers, files and Internet access (e.g., xDSL and cable modems). One well-known technology which has assisted in fueling the growth of networking is deployment of Local Area Networks (LAN) based on Ethernet (covered under several standards referred to generally as IEEE 802.3x), which has become the "default" LAN infrastructure standard.

At present, there are several types of the existing ubiquitous Ethernet technology that may be used in certain home networking applications, with each having its own standard to assure interoperability among various equipment vendors. A first type is the Power Line Communications (PLC) application that utilizes so-called Ethernet over Power (EoP) under the HomePlug standard, which allows the standard 10 Mbps Ethernet (IEEE 802.3) and 100 Mbps Fast Ethernet (IEEE 802.3u) to be deployed over the "common" home power line wiring distribution/infrastructure. The "HomePlug Powerline Alliance" (www.homeplug.org) coordinates interoperability among the various vendors of HomePlug compatible transceiver devices. A second type is the so-called Power over Ethernet (PoE) under the IEEE 802.3af standard, which allows DC power to be carried over the standard 10 Mbps Ethernet (IEEE 802.3) and 100 Mbps Fast Ethernet (IEEE802.3u) wirings. The underlying objective of PoE is to allow networking ready ancillary equipments/components the ease of having only "one" connectivity that combines the data and powering (less than 15 watts). The 802.3af standard provides for single cabling with a low voltage data line (Category 5, 5E, or higher grade) installation, and a nominal DC voltage of 48 volts (−10%, +20%) at 15.4 watts maximum continuous load.

SUMMARY OF THE INVENTION

The two types of existing Ethernet technology applications, based on EoP and PoE, each have their own standard which assures interoperability among various equipment vendors. However, such interoperability is limited to the devices of the separate and independent standards. There is a need for a capability that effectively combines the power line networking of the EoP approach with the streamlined connectivity of the PoE approach.

In accordance with the principles of the present invention, a transceiver device for coupling between a power line and a network interface unit includes a power line modem for transmitting and receiving data between the power line and the network interface unit and a power circuit that is adapted to deliver a DC power signal to the network interface unit.

According to one aspect, the power line modem may include a connector interface for coupling to the network interface unit, with the power circuit being coupled to the connector interface. The connector interface may be an RJ-45 connector with the DC power signal coupled to non-data pins of the RJ-45 connector.

According to another aspect, the power line modem may include a PHY interface that communicates with the connector interface, wherein the power circuit is coupled to the PHY interface. The PHY interface may include a transmit data transformer that communicates transmit data with transmit data pins of the connector interface and a receive data transformer that communicates receive data with receive data pins of the connector interface. One leg of the DC power signal may be coupled to a center tap of the transmit transformer and another leg of the DC power signal may be coupled to a center tap of the receive transformer to provide a phantom DC circuit over the transmit and receive data pins.

According to another aspect, the power circuit may be coupled to both the PHY interface and to the connector interface. The power circuit may include a primary DC power supply providing a 48 VDC supply signal, a discovery circuit and a load path control circuit. The discovery circuit may be coupled across the center tap of the transmit transformer and the center tap of the receive transformer of the PHY interface and be adapted to determine a type of network interface unit that is attached. The load path control circuit may be adapted to switch the 48 VDC supply signal to provide the DC power signal either to the PHY interface or to the connector interface based on the determined type.

According to yet another aspect, the power circuit may further include a current loading sensing switch that is coupled between the DC power supply and the load path control circuit. A power overloading sensor logic circuit may be adapted to monitor power load through the load path control circuit to disable the current loading sensing switch upon detecting a power overload.

In other embodiments, an adjustable DC output circuit may be coupled between the load path control circuit and the connector interface with a selectable switch for selecting a DC output voltage for power delivery to the connector interface. A DC outlet may be coupled to the output of the adjustable DC output circuit for coupling to the network interface unit without connecting through the connector interface of the power line modem.

According to another aspect, the device may include an enclosure that encloses the power line modem and the power circuit. In an embodiment, the enclosure may include a top surface, a bottom surface, and at least two side surfaces, the bottom surface having at least one ventilation slot for in flow, the side surfaces having at least one ventilation slot for in flow and at least one ventilation slot for out flow. The ventilation slots of the side surfaces may be recessed for improved convection air flow cooling and to minimize dust collection in the device.

According to another aspect, a method of communication between a power line and a network interface unit includes transmitting and receiving data between the power line and the network interface unit and delivering a DC power signal to the network interface unit. The transmitting and receiving may be with a power line modem that includes a connector interface for coupling to the network interface unit. Delivering may include coupling the DC power signal to the connector interface.

An advantage that the invention provides is the convergence of two totally distinctive types of Ethernet applications into a single device which can further enhance the reach of Ethernet networking by drastically simplifying the ability to network various types of equipment that may have differing powering and connectivity needs. Hence, embodiments of the invention can provide for home networking with "smart" appliances being networked seamlessly and efficiently.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
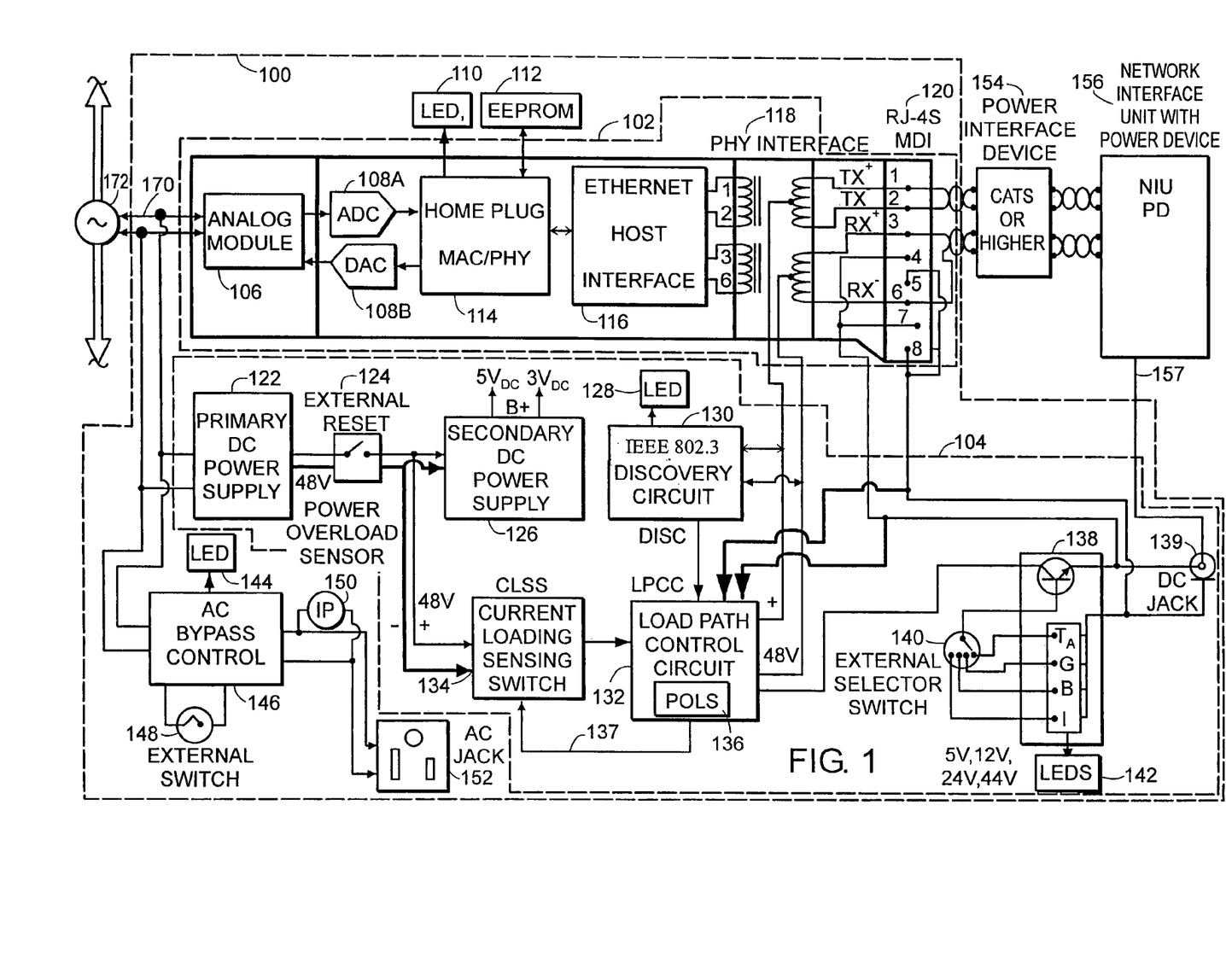
FIG. 1 is a schematic block diagram of an embodiment of a transceiver in accordance with the principles of the present invention.

FIG. 1 is a block diagram that illustrates principles of the present invention. A transceiver device 100 is shown coupled between power line 172 and network interface unit (NIU) 156. The device 100 is connected to power line 172 through AC plug 170. The power line 172 is generally configured to provide home distribution wiring for carrying AC power and data signals, preferably according to the standard for Ethernet over Power (EoP) as specified by the HomePlug Powerline Alliance. The device is connected to the NIU 156 over a power interface device 154 (e.g., Category 5, 5E or higher grade cabling).

The device 100 includes a power line modem 102 and a power circuit 104. Generally, the power circuit 104 is configured to couple a DC power signal to the power line modem 102 for delivery to the NIU 156.

The power line modem 102 includes an analog module 106; analog-to-digital converter (ADC) 108A and digital-to-analog converter (DAC) 108B; a HomePlug MAC/PHY device 114; an Ethernet host interface 116; a PHY interface 118; and media dependent interface (MDI) connector interface 120 (e.g., an RJ-45 connector). The analog module 106 is the power line interface front end to the home power line socket 170. The module 106 provides the necessary isolation and filtering of signals transmitted and received over the power line 172. The ADC 108A provides analog-to-digital conversion of the incoming data flow to the MAC/PHY device 114 which complies with the HomePlug standard. Interfaces are provided for external LEDs 110 and EEPROM 112. Processed data signals output from the MAC/PHY device 114 are further processed by the Ethernet host interface 116 which, in turn, converts the data signal to an IEEE 802.3 compliant Ethernet signal that is terminated at the PHY interface 118 and coupled at pin 1 (Tx+) and pin 2 (Tx−) of the RJ-45 jack 120 for transmission to the attached NIU 156 through the Category 5 or higher rated cabling 154.

Likewise, the incoming data signal from the NIU 156 is received at pin 3 (Rx+) and pin 6 (RX−) of the RJ-45 jack 154 and terminated at the PHY interface 118. This data signal is processed through the Ethernet host interface 116 and HomePlug MAC/PHY device 114 and converted from digital to analog by DAC 108B and sent through the analog module 106 to the power line interface 172.

There are at present various chip manufacturers that may supply some or all of the circuits as described above to provide a power line modem that is compliant with the HomePlug Powerline Alliance. Therefore, further details of operation of such a power line modem are not provided as such details can be understood by those skilled in the art.

The power circuit 104 is adapted to deliver DC power to either the PHY interface 118 (so-called "center tap" powering) or the MDI connector interface 120 (so-called "mid-span" powering), or both, depending on the type of NIU 156 that is connected to the device 100. The "center tap" and "mid-span" powering approaches are described in further detail herein.

In a PoE device, both the operational power and access power are derived through two separate power supplies. One provides the needed DC voltages to power the switch/hub logic circuits, typically both 5 VDC and 3 VDC. There is then an additional power supply with much higher power loading capability to power the required PoE application for each RJ-45 MDI port, which may vary from four to twenty four ports per switch/hub device. The IEEE 802.3af standard requires a 48 VDC supply with a range of −10% to +20% with continuous maximum load of 350 mA (minimum of 15.4 watts continuous power) that is required from the Data Terminal Equipment Power Sourcing Equipment (DTE PSE) to be supplied to the Power Device (PD) NIU through the Category 5 or higher rated either shielded or un-shielded twisted pair of cables.

The power as described above can be delivered through two methods to reach the PD NIU depending upon the capabilities of the PD NIU.

One legacy method practiced in the networking industry which is vendor specific and not necessarily compliant with the IEEE 802.3af standard calls for "mid-span" power sourcing equipment. In this approach, the power is injected by an external independent DC power supply to provide power through an intermediate power injection interface, which "patches" the power into the "unused" pins of the RJ-45 connector. The +VDC is connected to pin 4 and pin 7 and the −VDC is connected to pin 5 and pin 8. The supplied DC power can then be retracted through use of a "Power Retraction Interface" device in proximity to the NIU.

An alternative to "mid-span" power sourcing injection uses the same wiring to combine the power and data onto the same pair of shielded or unshielded twisted pairs. Rather than injecting the power onto the "unused" pairs of wires as described above, the power is injected onto the "center tap" of the PHY interface transformers, hence providing a "phantom" DC circuit riding on the data pair of cabling. In this case, the +VDC is connected to the center tap of the +Tx and −Tx pair with pin association 1 and 2 respectively. The −VDC is connected to the center tap of the +Rx and −Rx pair with the pin association 3 and 6 respectively. This power can then be retracted internally through the "Power Splitting Circuitry" to power the network ready ancillary NIU equipments internally.

The power circuit 104 includes a primary DC power supply 122 that delivers 48 VDC to a secondary DC power supply 126 and a current load sensing switch 134 through a reset switch 124. The secondary DC power supply provides lower level operational voltages (e.g., 5 VDC, 3 VDC) for operating the circuitry of device 100. Operation of the reset switch allows for a cold start of the device 100.

The 48 VDC power signal output from the primary DC power supply 122 is switched and regulated through the current load sensing switch 134 to a load path control circuit 132. The load path control circuit 132 determines whether the power signal is to be routed to the PHY interface 118 or to the MDI connector interface 120. The load path determination is based on a discovery signal DISC received from discovery circuit 130. The discovery circuit checks which type NIU is attached to determine whether or not the NIU is IEEE 802.3af compatible. An LED 128 is provided to indicate the corresponding compatibility status.

The IEEE 802.3af standard specifies means to power the PD NIU from DTE PSE through identifying such attached device through the "PD detection signature" techniques with a "Discovery" circuit. A "test voltage" is applied to determine the PD NIU's load characteristic. This detected PD signature by the DTE PSE will then determine whether or not the appropriate amount of power will be provided.

The discovery circuit 130 can be configured to directly or indirectly control both the "inrush" surge current limiting, to protect with the "overload/short" protections, and to disconnect the power in the event of either a non-compatible PD device is detected or remove in order to prevent any possible equipment damages. The IEEE 802.3af Discovery is specified as a means of characteristic impedance sensing capability: defined nominally as 25 k (19 k to 26.5 k) with parallel capacitance of less than 0.1 microfarad (uf) in a voltage range from 2.8V to 10V.

A power overload sensing logic circuit 136 that may reside with the load path control circuit 132 monitors and manages power loading through the control circuit 132 and can disable the current loading sensing switch 134 via control line 137 in the event of a detected overload condition.

In the event the NIU is identified by the discovery circuit 130 as IEEE 802.3af center tap PHY compatible, the power is switched by load path control circuit 132 to the mid-tap of the transformers of the PHY interface 118 and LED 128 may be activated.

In the event a mid-span NIU that is IEEE 802.3af compatible is discovered by the discovery circuit 130, the power is switched by load path control circuit 132 to a mid-span configuration for power insertion to pins 4, 5, 7, and 8 of MDI connector interface 120 and the LED 128 may be activated accordingly. However, in the event that the NIU is discovered to be non-compatible with IEEE802.3af, the load path control circuit 132 may still supply power for mid-span application but the power loading is monitored and managed very carefully through the power overload sensor 136. The power overload/disconnect sensor 136 either enables or disables the current loading sensing switch 134 accordingly and the LED 128 is activated or deactivated accordingly.

Figure 2:
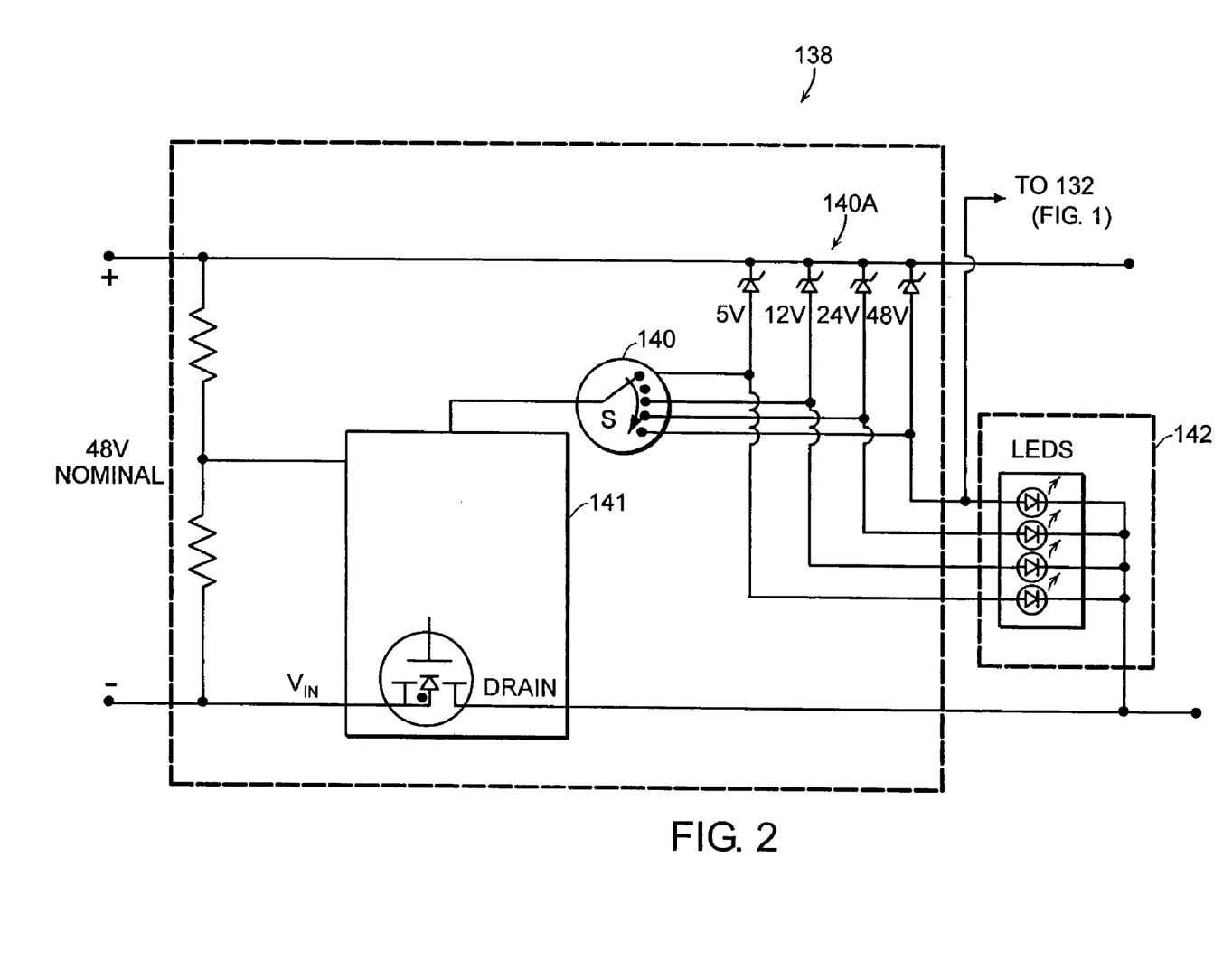
FIG. 2 is a schematic circuit diagram of an adjustable DC power circuit of the device of FIG. 1.

The power circuit 104 may further include an adjustable DC output circuit 138 to provide a selectable output voltage for mid-span applications. A selectable output voltage from the adjustable DC output circuit allows legacy but not necessarily IEEE802.3af compatible ancillary equipment to be powered. This power is available through the load path control circuit 132. Since there are legacy ancillary equipments available in the market by manufacturers who have selected various means of DC voltages for powering, the adjustable DC output circuit may be useful for such applications. An externally selectable switch 140 selects the various output DC voltages. This DC output connects to a DC power jack 139 for external connection on line 157 in cases in which the NIU comprises legacy equipment. For example, a legacy (non-IEEE 802.3af compatible) device may be a LAN-ready video camera that has separate RJ-45 and DC power jacks. In addition, the DC output also connects to RJ-45 MDI connector interface 120 through mid-span means of power delivery. Several LEDs 142 may be included to indicate the appropriate voltages selected and available at the DC jack 139 and the RJ-45 MDI connector interface 120. A diagram of the adjustable DC power circuit is illustrated in FIG. 2, which includes a selectable switch 140 for selecting voltage levels 5V, 12V, 24V, and 44V. A voltage regulator 141 (e.g., three pin bias type) operates with a reference input voltage to provide an output voltage determined by the selected Zener diode 140A.

Referring again to FIG. 1, in the event other than the IEEE 802.3af mid-span powering is selected, the discovery circuit 130 may sense the non-compatibility with IEEE 802.3af and the load path control circuit 132 disables power to the center-tap of PHY interface 118 and reroutes power to adjustable DC output circuit 138.

In other embodiments, an AC bypass control circuit 146 with external selectable switch 148 may be included to allow raw AC power to be bypassed to the an AC power outlet or plug 152. The AC power availability to the plug 152 may be indicated by the LED indicator 144 or gas fired light indicator 150.

Figure 3A:
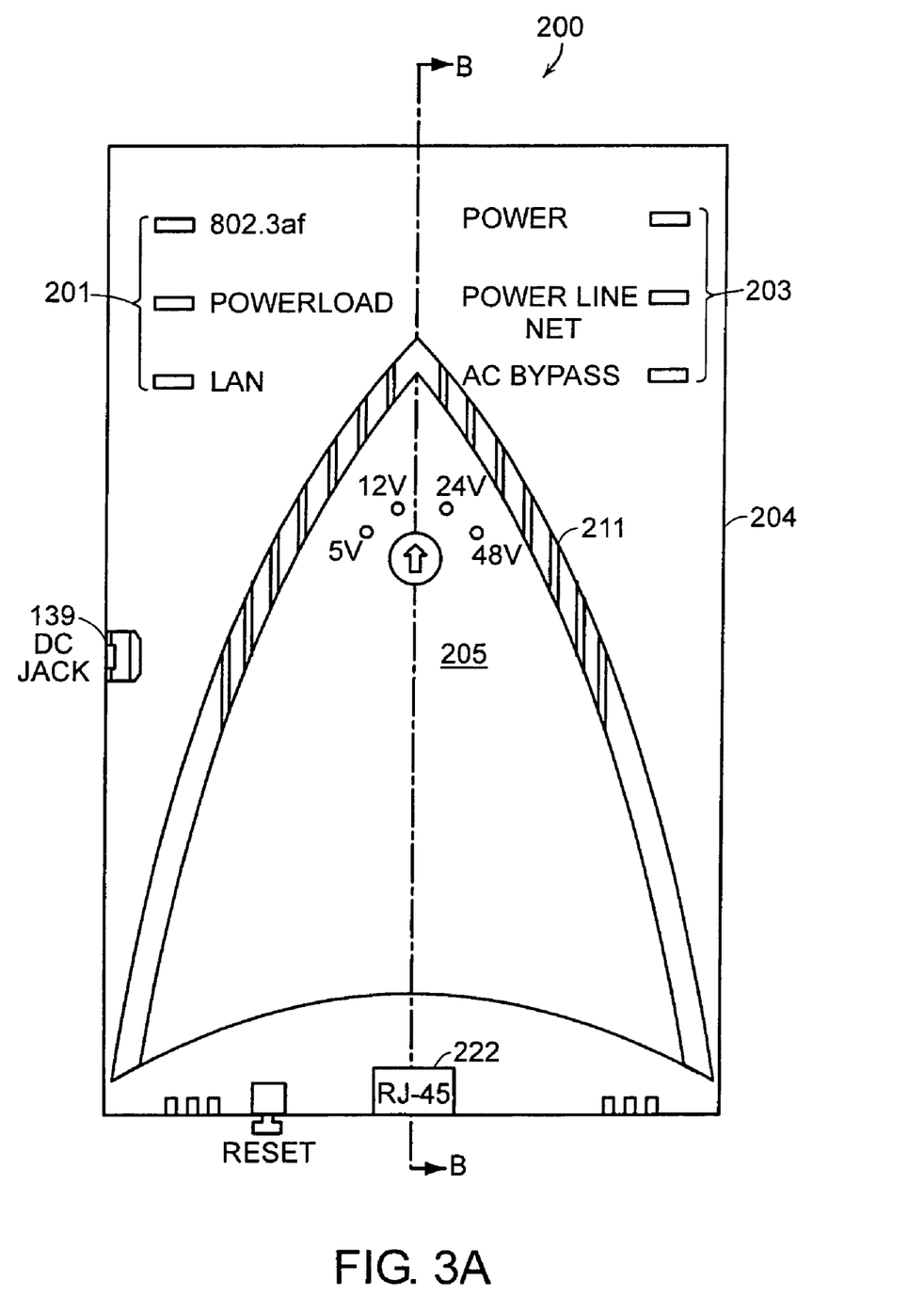
FIG. 3A illustrates a front view of an embodiment of an enclosure in accordance with the present invention.
Figure 3B:
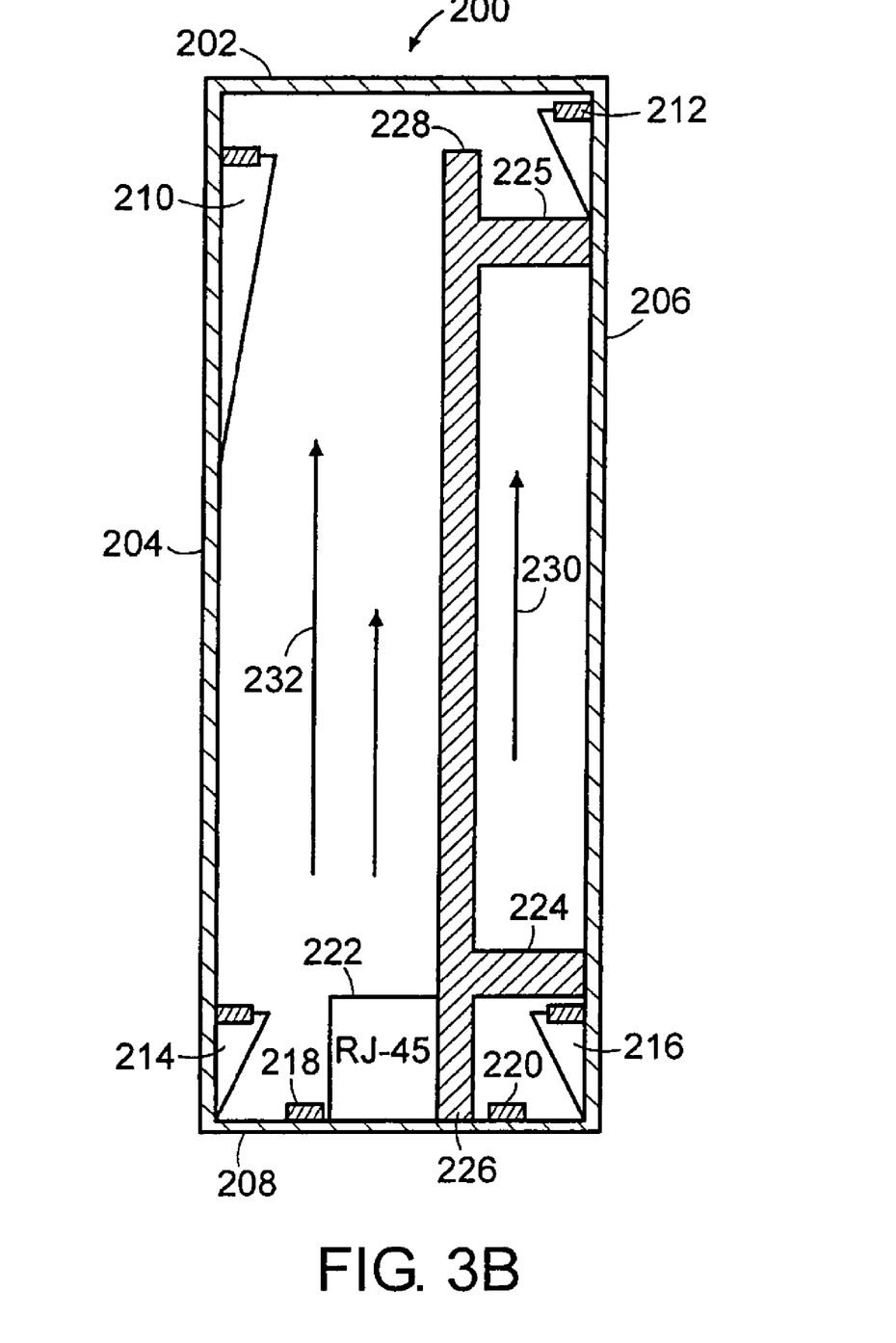
FIG. 3B illustrates a cross-sectional view of the enclosure of FIG. 3A.

Referring now to FIGS. 3A and 3B, an embodiment of an enclosure 200 is illustrated. The enclosure may be configured to house the power line modem 102, the power circuit 104 and the AC bypass circuitry (FIG. 1). FIG. 3A illustrates a front view of the enclosure. LED indicator areas 201, 203 and 205 are shown. DC jack 139 and RJ-45 connector may be recessed into the side and bottom, respectively, of the enclosure. A series of ventilation slots 211 are recessed into the front surface 204. While the ventilation slots are shown formed in a chevron-like shape, it should be understood that other arrangements, e.g., U-shaped, can be used.

FIG. 3B illustrates a sectional view of the enclosure 200 taken along line B-B of FIG. 3A. The enclosure includes top surface 202, front surface 204, back surface 206 and bottom surface 208. A printed circuit board 226 that may include the power line modem and power circuitry (FIG. 1) is shown vertically mounted within the enclosure 200 to mounting posts 224, 225. Ventilation slots 214, 216 recessed into the front and back surfaces 204, 206 respectively, and slots 218, 220 on bottom surface 208 provide for air "in" flow. Likewise, ventilation slots 210, 212 recessed into the side surfaces 204, 206 respectively, provide air "out" flow. Thus, an air flow 230, 232 of the convection type can be provided through the enclosure 200. This ventilation configuration provides for efficient air flow while minimizing the intake of dust into the enclosure.

Figure 4:
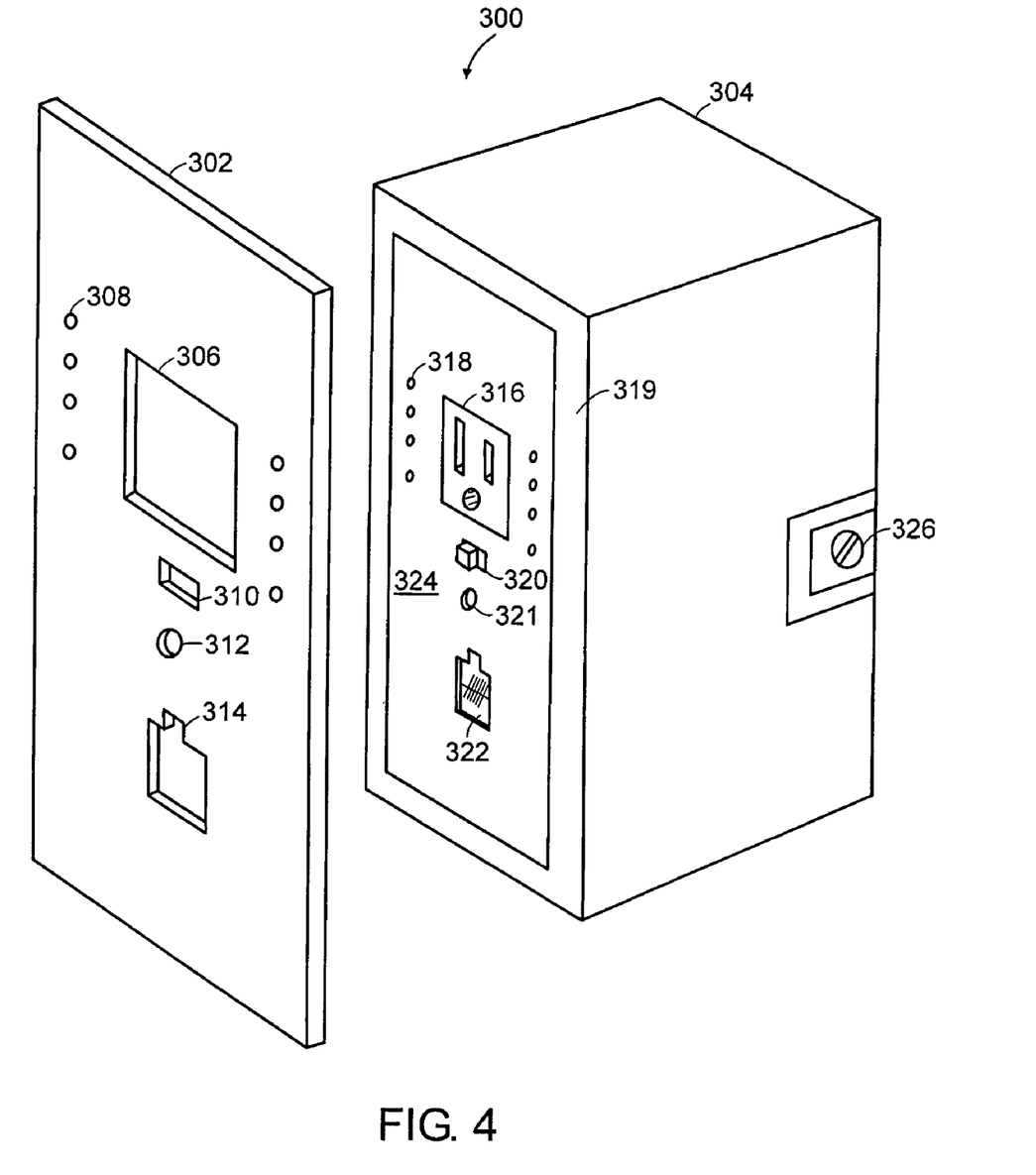
FIG. 4 illustrates an embodiment of another enclosure for in-wall mounting in accordance with the present invention.

FIG. 4 illustrates an embodiment of an in-wall enclosure 300 for use with structural premises wiring. A face plate 302 is detachably mountable to housing 304. The face plate 302 includes openings 306, 308, 310, 312, 314 for receiving corresponding AC plug 316, LED indicators 318, switch 320, indicator 321, and RJ-45 receptacle 322 when mounted to front face 324 of housing 304. The enclosure 300 further includes an AC terminal 326 for connection to AC power.

While this invention has been particularly shown and described with references to preferred embodiments thereof, it will be understood by those skilled in the art that various changes in form and details may be made therein without departing from the scope of the invention encompassed by the appended claims.

What is claimed is:

1. A transceiver device for coupling between an AC power line and an external network interface unit, the device comprising:
    a power line modem for transmitting and receiving data between the AC power line and the external network interface unit; and
    a power circuit adapted to deliver a DC power signal from the device to the external network interface unit wherein the power line modem includes a connector interface for coupling to the external network interface unit and the power circuit is coupled to the connector interface.

2. The transceiver of claim 1 wherein the connector interface is an RJ-45 connector and the DC power signal is coupled to non-data pins of the RJ-45 connector.

3. The transceiver of claim 1 wherein the power line modem includes a PHY interface in communication with the connector interface and wherein the power circuit is coupled to the PHY interface and to the connector interface.

4. The transceiver of claim 3 wherein the PHY interface includes a transmit data transformer that communicates transmit data with transmit data pins of the connector interface and a receive data transformer that communicates receive data with receive data pins of the connector interface, and wherein one leg of the DC power signal is coupled to a center tap of the transmit transformer and another leg of the DC power signal is coupled to a center tap of the receive transformer to provide a phantom DC circuit over the transmit and receive data pins.

5. The transceiver of claim 4 wherein the power circuit includes:
   a primary DC power supply providing a 48VDC supply signal;
   a discovery circuit coupled across the center tap of the transmit transformer and the center tap of the receive transformer of the PHY interface and adapted to determine a type of external network interface unit attached thereto;
   a load path control circuit adapted to switch the 48VDC supply signal to provide the DC power signal either to the PHY interface or to the connector interface based on the determined type.

6. The transceiver of claim 5 wherein the power circuit further includes:
   a current loading sensing switch coupled between the DC power supply and the load path control circuit; and
   a power overloading sensor logic circuit adapted to monitor power load through the load path control circuit and further adapted to disable the current loading sensing switch upon detecting a power overload.

7. The transceiver of claim 5 wherein the power circuit further includes:
   an adjustable DC output circuit coupled between the load path control circuit and the connector interface and having a selectable switch for selecting a DC output voltage for power delivery to the connector interface.

8. The transceiver of claim 7 wherein the power circuit further includes:
   a DC outlet coupled to the output of the adjustable DC output circuit.

9. The transceiver of claim 5 wherein the primary DC power supply is coupled to the power line.

10. The transceiver of claim 1 wherein the power circuit includes:
    an adjustable DC output circuit having a selectable switch for selecting a DC output voltage for power delivery to the external network interface unit.

11. The transceiver of claim 5 wherein the power circuit further includes:
    a secondary DC power supply coupled to the primary DC power supply and adapted to convert the 48VDC supply signal to secondary DC power signals.

12. The transceiver of claim 11 wherein the power circuit further includes:
    a reset switch coupled between the primary DC power supply and the secondary DC power supply for providing reset of power to the transceiver.

13. The transceiver of claim 1 further comprising an AC bypass control circuit coupled to the power line and an AC outlet, the bypass control circuit having a selectable switch which in one position enables AC power to the AC outlet and in another position disables AC power to the AC outlet.

14. The transceiver of claim 1 further comprising an enclosure that encloses the power line modem and the power circuit, the enclosure having a top surface, a bottom surface, and at least two side surfaces, the bottom surface having at least one ventilation slot for in flow, the side surfaces having at least one ventilation slot for in flow and at least one ventilation slot for out flow.

15. The transceiver of claim 14 wherein the ventilation slots of the side surfaces are recessed.

16. A transceiver device for coupling between an AC power line and an external network interface unit, the device comprising:
    a power line modem for transmitting and receiving data between the AC power line and the external network interface unit; and
    a power circuit adapted to deliver a DC power signal from the device to the external network interface unit wherein the power line modem includes a PHY interface in communication with a connector interface for coupling to the external network interface unit and wherein the power circuit is coupled to the PHY interface.

17. The transceiver of claim 16 wherein the PHY interface includes a transmit data transformer that communicates transmit data with transmit data pins of the connector interface and a receive data transformer that communicates receive data with receive data pins of the connector interface, and wherein one leg of the DC power signal is coupled to a center tap of the transmit transformer and another leg of the DC power signal is coupled to a center tap of the receive transformer to provide a phantom DC circuit over the transmit and receive data pins.

18. A method of communication between an AC power line and an external network interface unit, the method comprising:
    transmitting and receiving data between the AC power line and the external network interface unit; and
    delivering a DC power signal to the external network interface unit wherein transmitting and receiving is with a power line modem that includes a connector interface for coupling to the external network interface unit and wherein delivering includes coupling the DC power signal to the connector interface.

19. The method of claim 18 wherein the connector interface is an RJ-45 connector and the DC power signal is coupled to non-data pins of the RJ-45 connector.

20. The method of claim 18 wherein the power line modem includes a PHY interface in communication with the connector interface and wherein delivering includes coupling the DC power signal to the PHY interface and to the connector interface.

21. The method of claim 20 wherein the PHY interface includes a transmit data transformer that communicates transmit data with transmit data pins of the connector interface and a receive data transformer that communicates receive data with receive data pins of the connector interface, and wherein one leg of the DC power signal is coupled to a center tap of the transmit transformer and another leg of the DC power signal is coupled to a center tap of the receive transformer to provide a phantom DC circuit over the transmit and receive data pins.

22. The method of claim 21 further comprising:
    coupling a discovery circuit across the center tap of the transmit transformer and the center tap of the receive transformer of the PHY interface to determine a type of external network interface unit attached thereto; and
    switching the DC power signal either to the PHY interface or to the connector interface based on the determined type.

23. A method of communication between an AC power line and an external network interface unit, the method comprising:
    transmitting and receiving data between the AC power line and the external network interface unit; and
    delivering a DC power signal to the external network interface unit wherein transmitting and receiving is with a power line modem that includes a PHY interface in communication with a connector interface for coupling to the external network interface unit and wherein delivering includes coupling the DC power signal to the PHY interface.

24. The method of claim 23 wherein the PHY interface includes a transmit data transformer that communicates transmit data with transmit data pins of the connector interface and a receive data transformer that communicates receive data with receive data pins of the connector interface, and wherein one leg of the DC power signal is coupled to a center tap of the transmit transformer and another leg of the DC power signal is coupled to a center tap of the receive transformer to provide a phantom DC circuit over the transmit and receive data pins.

* * * * *

UNITED STATES PATENT AND TRADEMARK OFFICE
CERTIFICATE OF CORRECTION

PATENT NO.       : 7,660,345 B2
APPLICATION NO.  : 10/871361
DATED            : February 9, 2010
INVENTOR(S)      : Hong Yu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Thirtieth Day of November, 2010

David J. Kappos
*Director of the United States Patent and Trademark Office*